United States Patent
Lu et al.

(10) Patent No.: US 11,006,396 B2
(45) Date of Patent: May 11, 2021

(54) DATA PROCESSING METHOD, BASE STATION, AND TERMINAL

(71) Applicant: Huawei Technologies Co., Ltd., Guangdong (CN)

(72) Inventors: Yawei Lu, Shenzhen (CN); Peng Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/399,644

(22) Filed: Apr. 30, 2019

(65) Prior Publication Data
US 2019/0261357 A1    Aug. 22, 2019

Related U.S. Application Data

(63) Continuation of application No. PCT/CN2017/107575, filed on Oct. 25, 2017.

(30) Foreign Application Priority Data

Nov. 2, 2016  (CN) .......................... 201610945881.3

(51) Int. Cl.
*H04W 72/04* (2009.01)
*H04L 5/00* (2006.01)
(Continued)

(52) U.S. Cl.
CPC ....... *H04W 72/0413* (2013.01); *H04L 5/0037* (2013.01); *H04W 72/0446* (2013.01);
(Continued)

(58) Field of Classification Search
CPC . H04W 72/00; H04W 72/04; H04W 72/0413; H04W 72/044; H04W 72/0446;
(Continued)

(56) References Cited

U.S. PATENT DOCUMENTS

| | | | |
|---|---|---|---|
| 2005/0163068 A1 | 7/2005 | Saifuddin | |
| 2007/0253378 A1* | 11/2007 | Mahadevaiyer | H04W 28/22 370/338 |

(Continued)

FOREIGN PATENT DOCUMENTS

| | | |
|---|---|---|
| CN | 1672343 | 9/2005 |
| CN | 101064679 A | 10/2007 |

(Continued)

OTHER PUBLICATIONS

ZTE, "Discussion on grant-free transmission based on sensing," 3GPP TSG RAN WG1 Meeting #86bis, R1-1609801, Lisbon, Portugal, Oct. 10-14, 2016, 4 pages.
(Continued)

*Primary Examiner* — Warner Wong
(74) *Attorney, Agent, or Firm* — Slater Matsil, LLP

(57) ABSTRACT

Embodiments of this application provide a data processing method, a base station, and a terminal. A base station receive first data from a first terminal on a first resource, and receive second data from the first terminal and third data from a second terminal on a second resource, where a modulation order of the second data is lower than a modulation order of the first data, and/or a code rate of the second data is less than a code rate of the first data, and/or a transmit power of the second data is less than a transmit power of the first data. The base station demodulates and decodes the first data, the second data and the third data. Therefore, the embodiments of this application can effectively improve decoding success rates of data that is of different users and that is transmitted on a same resource.

8 Claims, 6 Drawing Sheets

(51) Int. Cl.
  *H04W 72/08* (2009.01)
  *H04W 72/12* (2009.01)
(52) U.S. Cl.
  CPC ..... *H04W 72/0473* (2013.01); *H04W 72/082* (2013.01); *H04W 72/085* (2013.01); *H04W 72/12* (2013.01); *H04W 72/1231* (2013.01)
(58) Field of Classification Search
  CPC ......... H04W 72/0466; H04W 72/0473; H04W 72/082; H04W 72/085; H04W 28/00; H04W 16/00; H04W 16/02; H04L 5/0037
  See application file for complete search history.

(56) References Cited

U.S. PATENT DOCUMENTS

| | | | | |
|---|---|---|---|---|
| 2012/0113920 | A1* | 5/2012 | Cheng | H04W 52/325 370/329 |
| 2013/0094456 | A1* | 4/2013 | Ng | H04L 5/0091 370/329 |
| 2014/0029537 | A1* | 1/2014 | Golitschek Edler von Elbwart | H04L 5/0094 370/329 |
| 2014/0146756 | A1 | 5/2014 | Sahin et al. | |
| 2015/0098420 | A1 | 4/2015 | Luo et al. | |
| 2015/0245320 | A1 | 8/2015 | Chen et al. | |
| 2015/0358977 | A1* | 12/2015 | Seo | H04W 72/082 455/452.1 |
| 2017/0086150 | A1 | 3/2017 | Wang | |
| 2017/0142662 | A1* | 5/2017 | Sutskover | H04W 52/262 |
| 2018/0070265 | A1 | 3/2018 | Seo et al. | |
| 2018/0131473 | A1* | 5/2018 | Moon | H04L 5/0051 |
| 2019/0288787 | A1* | 9/2019 | Gao | H04L 5/0055 |

FOREIGN PATENT DOCUMENTS

| | | |
|---|---|---|
| CN | 101282324 A | 10/2008 |
| CN | 101945445 | 1/2011 |
| CN | 103299572 | 9/2013 |
| CN | 103731909 A | 4/2014 |
| CN | 104488332 | 4/2015 |
| CN | 105553608 | 5/2016 |
| CN | 105612706 | 5/2016 |
| WO | 2015163672 | 10/2015 |
| WO | 2016171494 A1 | 10/2016 |
| WO | 2018071155 A1 | 4/2018 |

OTHER PUBLICATIONS

ZTE, "On Resource Assignment and Interference Handling for Flexible TDD", 3GPP TSG RAN WG1 Meeting #86bis, R1-1609716, Lisbon, Portugal, Oct. 10-14, 2016, 7 pages.

Samsung, "Multiplexing UL URLLC and eMBB," 3GPP TSG RAN WG1 #86bis, R1-1609056, Lisbon, Portugal, Oct. 10-14, 2016, 2 pages.

3rd Generation Partnership Project; Technical Specification Group Radio Access Network; Evolved Universal Terrestrial Radio Access (E-UTRA); Physical layer procedures (Release 14), 3GPP TS 36.213 V14.0.0 (Sep. 2016), 406 pages.

NTT Docomo, Inc., "Uplink multiple access schemes for NR," 3GPP TSG RAN WG1 Meeting #85, R1-165174, Nanjing, China, May 23-17, 2016, 4 pages.

Huawei et al., Overview of URLLC support in NR, 3GPP TSG-RAN WG1#86b, R1-1608843, Oct. 10-14, 2016, 8 pages, Lisbon, Portugal.

Huawei et al., Support of URLLC in UL, 3GPP TSG-RAN WG1#86b, R1-1608845, Oct. 10-14, 2016, 7 pages, Lisbon, Portugal.

Samsung, Evaluation results of superposition scheme in case of multiplexing eMBB and URLLC, 3GPP TSG-RAN WG1#86b, R1-1609058 , Oct. 10-14, 2016, 6 pages, Lisbon, Portugal.

Sony, "Non-orthogonal multiple access for uplink", 3GPP TSG RAN WG1 #86, R1-166651, Gothenburg, Sweden, Aug. 22-26, 2016, 4 pages.

* cited by examiner

DATA PROCESSING METHOD, BASE STATION, AND TERMINAL

CROSS-REFERENCE TO RELATED APPLICATIONS

This application is a continuation of International Application No. PCT/CN2017/107575, filed on Oct. 25, 2017, which claims priority to Chinese Patent Application No. 201610945881.3, filed on Nov. 2, 2016. The disclosures of the aforementioned applications are hereby incorporated by reference in their entireties.

TECHNICAL FIELD

This application relates to the communications field, and more specifically, to a data processing method, a base station, and a terminal.

BACKGROUND

In an uplink solution of a Long Term Evolution (LTE) system, a user needs to initiate a resource scheduling request before uplink transmission. Usually, at least seven transmission time intervals (TTI) are needed from the initiation of the resource scheduling request to data sending. A mechanism for the resource scheduling request cannot satisfy a requirement of a low-latency service. For example, an ultra-reliable and low-latency communications (URLLC) service requires very high reliability and a very low latency, where typical values of the reliability and the latency are 99.9990 and 1 millisecond (ms), respectively.

In a current technology, for a low-latency service (where a URLLC service is used as an example for description below), a base station groups uplink system resources into a primitive resource and a reserved resource. The reserved resource is a resource reserved for the URLLC service. When URLLC service data arrives, the data is directly transmitted on a nearest reserved resource in time domain. For another non-low-latency service, for example, an enhanced mobile broadband (eMBB) service, after receiving a resource scheduling request for the service, the base station determines all uplink system resources, that is, both the primitive resource and the reserved resource, as transmission resources for the non-low-latency service (an eMBB service is used as an example for description below). An eMBB terminal sends eMBB service data on both a primitive resource and a reserved resource. When URLLC service data arrives, a URLLC terminal also sends the URLLC service data on the reserved resource. In this case, the reserved resource is non-orthogonally multiplexed for the eMBB service data and the URLLC service data, and the eMBB service data and the URLLC service data interfere with each other. Consequently, the eMBB service data may not be successfully decoded. Because interference of the eMBB service data cannot be cancelled, the URLLC service data cannot be successfully decoded either. Therefore, transmission performance of both the eMBB service data and the URLLC service data is reduced.

SUMMARY

This application provides a data processing method, a base station, and a terminal, to effectively improve decoding success rates of data that is of different users and that is transmitted on a same resource.

According to a first aspect, a data processing method is provided. The method includes: receiving, by a base station, first data from a first terminal on a first resource; receiving, by the base station, second data from the first terminal and third data from a second terminal on a second resource, where a modulation order of the second data is lower than a modulation order of the first data, and/or a code rate of the second data is less than a code rate of the first data, and/or a transmit power of the second data is less than a transmit power of the first data; demodulating and decoding, by the base station, the first data; and demodulating and decoding, by the base station, the second data and the third data.

In the prior art, the first terminal sends data to the base station separately on a first resource and a second resource based on a same modulation order, code rate, and transmit power. When the second terminal also sends data to the base station on the second resource, the two pieces of data (the data sent by the first terminal and the second terminal on the second resource) transmitted on the second resource interfere with each other. This may lead to a failure in decoding second data of the first terminal and third data of the second terminal that are transmitted on the second resource.

In this solution, the first terminal sends data on the first resource and on the second resource by using different configuration information. To be specific, a modulation order of data sent by the first terminal on the second resource is lower than a modulation order of data sent by the first terminal on the first resource, and/or a code rate of the data sent by the first terminal on the second resource is less than a code rate of the data sent by the first terminal on the first resource, and/or a transmit power of the second data is less than a transmit power of the first data. It should be understood that, a lower modulation order of the second data leads to a higher probability of successfully decoding the second data, and higher accuracy of reconstructing the second data when interference is cancelled, thereby leading to a higher interference cancellation rate and a higher probability of successfully decoding the third data. A lower code rate of the second data leads to a higher probability of successfully decoding the second data, and higher accuracy of reconstructing the second data when interference is cancelled, thereby leading to a higher interference cancellation rate and a higher probability of successfully decoding the third data. A lower transmit power of the second data leads to less interference on the third data, a higher probability of successfully decoding the third data, and higher accuracy of reconstructing the third data when interference is cancelled, thereby leading to a higher interference cancellation rate and a higher probability of successfully decoding the second data. Therefore, the technical solution provided in this application can effectively improve a success rate of decoding, by the base station, the two pieces of data (the data sent by the first terminal and the second terminal on the second resource) that are transmitted on the second resource.

With reference to the first aspect, in a possible implementation of the first aspect, the method further includes: sending, by the base station, first configuration information to the first terminal, where the first configuration information is configuration information required when the first terminal sends data on the first resource, and the first configuration information includes at least one of the following information: modulation order information of the first data, code rate information of the first data, and transmit power information of the first data.

With reference to the first aspect or some of the foregoing implementations of the first aspect, in a possible implementation of the first aspect, the base station sends second configuration information to the first terminal, where the second configuration information is configuration information required when the first terminal sends data on the second resource, and the second configuration information includes at least one of the following information: modulation order information of the second data, code rate information of the second data, and transmit power information of the second data.

Optionally, in an implementation, the base station may deliver the first configuration information and/or the second configuration information to the first terminal through physical layer control signaling such as a physical downlink control channel (PDCCH), through medium access control (MAC) signaling such as a MAC control element (CE), or through radio resource control (RRC) signaling.

Optionally, in an implementation, configuration information required when the first terminal sends data on the first resource and the second resource may alternatively be system-predefined.

With reference to the first aspect or some of the foregoing implementations of the first aspect, in a possible implementation of the first aspect, both the second data and the third data are encoded by using a multiple-access coding technology, and a codebook used when multiple access coding is performed on the second data is different from a codebook used when multiple access coding is performed on the third data.

In this solution, the first terminal and the second terminal multiplexing the second resource select different codebooks to perform multiple access coding on to-be-transmitted data. It should be understood that, in the multiple-access coding technology, a plurality of users are allowed to multiplex a same resource, and a receive end device can recover data of all users multiplexing the second resource. That is, the base station can successfully decode the data that is of the first terminal and the second terminal and that is on the second resource. Therefore, the technical solution provided in this application can further improve the success rate of decoding, by the base station, the two pieces of data (the data sent by the first terminal and the second terminal on the second resource) that are transmitted on the second resource.

With reference to the first aspect or some of the foregoing implementations of the first aspect, in a possible implementation of the first aspect, the method further includes: sending, by the base station, a first codebook to the first terminal, to instruct the first terminal to use the first codebook to perform code division multiple access processing when sending data on the second resource; and/or sending, by the base station, a second codebook to the second terminal, to instruct the second terminal to use the second codebook to perform code division multiple access processing when sending data on the second resource.

With reference to the first aspect or some of the foregoing implementations of the first aspect, in a possible implementation of the first aspect, the method further includes: receiving, by the base station, a resource scheduling request from the first terminal, where the resource scheduling request is used to request transmission resources for the first terminal; and sending, by the base station, a resource scheduling response to the first terminal, where the resource scheduling response is used to indicate that the first resource and the second resource are transmission resources for the first terminal.

With reference to the first aspect or some of the foregoing implementations of the first aspect, in a possible implementation of the first aspect, the second resource is a resource reserved for the second terminal. The second resource may also be referred to as a reserved resource for the second terminal.

With reference to the first aspect or some of the foregoing implementations of the first aspect, in a possible implementation of the first aspect, the first terminal is an enhanced mobile broadband eMBB terminal, and the second terminal is an ultra-reliable and ultra-low-latency communications URLLC terminal.

According to a second aspect, a data processing method is provided. The method includes: determining, by a first terminal, to-be-transmitted target data; sending, by the first terminal, first data in the target data on a first resource; and sending, by the first terminal, second data in the target data on a second resource, where the second data is data in the target data except the first data, the second resource is further used to transmit third data sent by a second terminal, and a modulation order of the second data is lower than a modulation order of the first data, and/or a code rate of the second data is less than a code rate of the first data, and/or a transmit power of the second data is less than a transmit power of the first data.

In this solution, the first terminal sends data on the first resource and on the second resource by using different configuration information. To be specific, a modulation order of data sent by the first terminal on the second resource is lower than a modulation order of data sent by the first terminal on the first resource, and/or a code rate of the data sent by the first terminal on the second resource is less than a code rate of the data sent by the first terminal on the first resource, and/or a transmit power of the second data is less than a transmit power of the first data. It should be understood that, a lower modulation order of the second data leads to a higher probability of successfully decoding the second data, and higher accuracy of reconstructing the second data when interference is cancelled, thereby leading to a higher interference cancellation rate and a higher probability of successfully decoding the third data. A lower code rate of the second data leads to higher accuracy of reconstructing the second data when interference is cancelled, thereby leading to a higher interference cancellation rate and a higher probability of successfully decoding the third data. A lower transmit power of the second data leads to less interference on the third data, a higher probability of successfully decoding the third data, and higher accuracy of reconstructing the third data when interference is cancelled, thereby leading to a higher interference cancellation rate and a higher probability of successfully decoding the second data. Therefore, the technical solution provided in this application can effectively improve a success rate of decoding, by a base station, the two pieces of data (the data sent by the first terminal and the second terminal on the second resource) that are transmitted on the second resource.

With reference to the second aspect, in a possible implementation of the second aspect, the method further includes: receiving, by the first terminal, first configuration information from the base station, where the first configuration information is configuration information required when the first terminal sends data on the first resource, and the first configuration information includes at least one of the following information: modulation order information of the first data, code rate information of the first data, and transmit power information of the first data.

With reference to the second aspect or some of the foregoing implementations of the second aspect, in a possible implementation of the second aspect, the method further includes: receiving, by the first terminal, second configuration information from the base station, where the second configuration information is configuration information required when the first terminal sends data on the second resource, and the second configuration information includes at least one of the following information: modulation order information of the second data, code rate information of the second data, and transmit power information of the second data.

Optionally, in an implementation, the first terminal may obtain the first configuration information and/or the second configuration information through physical layer control signaling such as a PDCCH delivered by the base station, through MAC signaling such as a MAC CE delivered by the base station, or through RRC signaling delivered by the base station.

Optionally, in an implementation, configuration information required when the first terminal sends data on the first resource and the second resource may alternatively be system-predefined.

With reference to the second aspect or some of the foregoing implementations of the second aspect, in a possible implementation of the second aspect, the sending, by the first terminal to a base station, second data in the target data on a second resource includes: sending, by the first terminal to the base station on the second resource, the second data that is encoded by using a multiple-access coding technology, where the third data is also encoded by using the multiple-access coding technology, and a multiple access codebook corresponding to the second data is different from a multiple-access coding codebook corresponding to the third data.

In this solution, the first terminal and the second terminal multiplexing the second resource select different codebooks to perform multiple access coding on to-be-transmitted data. It should be understood that, in the multiple-access coding technology, a plurality of users are allowed to multiplex a same resource, and a receive end device can recover data of all users multiplexing the second resource. That is, the base station can successfully decode the data that is of the first terminal and the second terminal and that is on the second resource. Therefore, the technical solution provided in this application can further improve the success rate of decoding, by the base station, the two pieces of data (the data sent by the first terminal and the second terminal on the second resource) that are transmitted on the second resource.

With reference to the second aspect or some of the foregoing implementations of the second aspect, in a possible implementation of the second aspect, the method further includes: receiving, by the first terminal, a first codebook sent by the base station, where the first codebook is a codebook required when the first terminal performs multiple access coding on the second data. The base station further sends a second codebook to the second terminal, where the second codebook is a codebook required when the second terminal performs multiple access coding on the third data, and the first codebook is different from the second codebook.

With reference to the second aspect or some of the foregoing implementations of the second aspect, in a possible implementation of the second aspect, the target data is an encoded bitstream obtained after the first terminal performs channel coding on original data, where the encoded bitstream includes information bits and redundant bits, and the second data includes all or some redundant bits in the encoded bitstream.

In this solution, the first terminal preferentially transmits the redundant bits on the second resource. That is, the information bits are mainly transmitted on the first resource. Because the base station can successfully decode the data transmitted on the first resource, the base station can successfully decode the redundant bits on the second resource. In this case, even though the first terminal and the second terminal multiplex the second resource, the base station can successfully decode the data sent by the first terminal, thereby successfully decoding the data sent by the second terminal. Therefore, the technical solution provided in this application can effectively improve a success rate of decoding, by the base station, the two pieces of data (the data sent by the first terminal and the second terminal on the second resource) that are transmitted on the second resource.

With reference to the second aspect or some of the foregoing implementations of the second aspect, in a possible implementation of the second aspect, the method further includes: when a transmission resource required for all redundant bits in the encoded bitstream is equal to the second resource, using all the redundant bits in the encoded bitstream as the second data; when a transmission resource required for all redundant bits in the encoded bitstream is smaller than the second resource, using all the redundant bits and some information bits in the encoded bitstream as the second data, where a sum of the transmission resource required for all the redundant bits and a transmission resource required for the some information bits is equal to the second resource; or when a transmission resource required for all redundant bits in the encoded bitstream is larger than the second resource, using some redundant bits in the encoded bitstream as the second data, where a transmission resource required for the some redundant bits is equal to the second resource.

With reference to the second aspect or some of the foregoing implementations of the second aspect, in a possible implementation of the second aspect, the method further includes: sending, by the first terminal, a resource scheduling request to the base station, where the resource scheduling request is used to request transmission resources for the first terminal, and receiving, by the first terminal, a resource scheduling response from the base station, where the resource scheduling response is used to indicate that the first resource and the second resource are transmission resources for the first terminal.

With reference to the second aspect or some of the foregoing implementations of the second aspect, in a possible implementation of the second aspect, the second resource is a resource reserved for the second terminal.

With reference to the second aspect or some of the foregoing implementations of the second aspect, in a possible implementation of the second aspect, the first terminal is an enhanced mobile broadband eMBB terminal, and the second terminal is an ultra-reliable and ultra-low-latency communications URLLC terminal.

Optionally, in the foregoing implementations, the second resource is system-predefined as a resource reserved for the second terminal.

Optionally, in the foregoing implementations, the second resource is a resource reserved by the base station for the second terminal, and the base station sends a message to the first terminal and the second terminal, to inform that the second resource is a reserved resource for the second terminal.

According to a third aspect, a base station is provided. The base station is configured to perform the method according to the first aspect or any possible implementation of the first aspect. Specifically, the base station may include modules configured to perform the method according to the first aspect or any possible implementation of the first aspect.

According to a fourth aspect, a terminal is provided. The terminal is configured to perform the method according to the second aspect or any possible implementation of the second aspect. Specifically, the terminal may include modules configured to perform the method according to the second aspect or any possible implementation of the second aspect.

According to a fifth aspect, a base station is provided. The base station includes a memory and a processor. The memory is configured to store an instruction, the processor is configured to execute the instruction stored in the memory, and the execution of the instruction stored in the memory enables the processor to perform the method according to the first aspect or any possible implementation of the first aspect.

According to a sixth aspect, a terminal is provided. The terminal includes a memory and a processor. The memory is configured to store an instruction, the processor is configured to execute the instruction stored in the memory, and the execution of the instruction stored in the memory enables the processor to perform the method according to the second aspect or any possible implementation of the second aspect.

DESCRIPTION OF EMBODIMENTS

The following describes technical solutions in embodiments of this application with reference to accompanying drawings.

It should be understood that, the technical solutions in the embodiments of this application may be applied to a Long Term Evolution (LTE) architecture, a frequency division duplex Long Term Evolution (FDD LTE) architecture, and a time division duplex Long Term Evolution (TDD LTE) architecture. The technical solutions in the embodiments of this application may further be applied to other communications systems, for example, a public land mobile network (PLMN) system, or even a future 5G communications system or a communications system later than 5G. This is not limited in the embodiments of this application.

The embodiments of this application relate to a terminal. The terminal may also be referred to as user equipment (UE), an access terminal, a subscriber unit, a subscriber station, a mobile station, a mobile console, a remote station, a remote terminal, a mobile device, a user terminal, a terminal device, a wireless communications device, a user agent, or a user apparatus. For example, the terminal may be a mobile phone (or referred to as a "cellular" phone), a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal in a future 5G network or a network later than 5G. This is not limited in the embodiments of this application.

The terminal may communicate with one or more core networks by using a radio access network (RAN), or may access a distributed point-to-point (Ad-Hoc) mode network in a self-organizing or license-free manner and a subnet deployed by a user. The terminal may alternatively access a network in another manner for communication. This is not limited in the embodiments of this application.

The embodiments of this application further relate to a base station. The base station may be a network device configured to communicate with the terminal. Specifically, the base station may be a network device providing wireless access and communications services for a mobile or fixed terminal in a cell. For example, the base station may be an evolved NodeB (eNB or eNodeB) in an LTE system, or may be a relay station, an access point, an in-vehicle device, a wearable device, a network side device in a future 5G network or a network later than 5G, a network side device in a future evolved PLMN network, or the like. The base station in the embodiments of this application may also be referred to as a network device.

Figure 1:
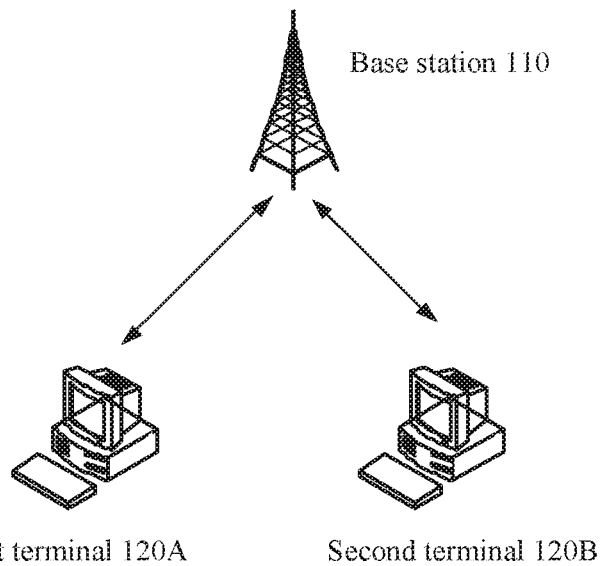
FIG. 1 is a schematic diagram of an application scenario according to an embodiment of this application.

FIG. 1 is a schematic diagram of an application scenario according to an embodiment of this application. A base station 110 and a terminal 120 communicate with each other by using an air interface technology. The air interface technology includes, for example, a 4G technology, a 4.5G technology, or a 5G technology. The terminal 120 includes at least two terminals shown in FIG. 1: a first terminal 120A and a second terminal 120B. The first terminal 120A needs to initiate a resource scheduling request to the base station 110 before uplink transmission. The base station 110 allocates an uplink transmission resource to the first terminal 120A based on the resource scheduling request. The base station 110 may reserve a transmission resource (a reserved resource) for the second terminal 120B. That is, when the second terminal 120B has uplink data, the second terminal 120B can directly use the reserved resource to perform uplink transmission, without sending a resource scheduling request to the base station 110. It should be understood that, alternatively, the second terminal 120B may initiate a resource scheduling request to the base station 110 before uplink transmission.

Specifically, for an uplink service, the base station 110 groups system resources into a primitive resource and a reserved resource. The reserved resource is the resource reserved for the second terminal 120B. That is, when the second terminal 120B has uplink data, the second terminal 120B directly sends the uplink data on the reserved resource. Specifically, the reserved resource may be system-predefined as a resource reserved for the second terminal 120B. Alternatively, the reserved resource is a resource reserved by the base station for the second terminal 120B, and the base station is configured to inform the first terminal 120A and the second terminal 120B that the reserved resource is the resource reserved for the second terminal 120B.

When processing the resource scheduling request of the first terminal 120A, the base station 110 allocates all system resources to the first terminal 120A. That is, the first terminal 120A may send uplink data on both the primitive resource and the reserved resource.

It should further be understood that, in the application scenario shown in FIG. 1, the second terminal 120B may be referred to as a high-priority terminal, and correspondingly, a service processed by the second terminal 120B is a high-priority service. For example, the service processed by the second terminal 120B has low-latency and high-reliability requirements. Specifically, the service is a URLLC service, and the second terminal 120B may also be referred to as a URLLC terminal. The first terminal 120A may be referred to as a low-priority terminal, and a service processed by the first terminal 120A is a low-priority service. For example, the service processed by the first terminal 120A is an eMBB service, and the first terminal 120A may also be referred to as an eMBB terminal. URLLC, eMBB, and massive machine type communication (mMTC) are defined by the International Telecommunications Union (ITU) as three typical application scenarios in future 5G.

In the prior art, the first terminal 120A does not distinguish a reserved resource and a primitive resource. In other words, a modulation scheme used by the first terminal 120A to send data on a reserved resource is the same as a modulation scheme used by the first terminal 120A to send data on a primitive resource, or a code rate used by the first terminal 120A to send data on a reserved resource is the same as a code rate used by the first terminal 120A to send data on a primitive resource, or a transmit power used by the first terminal 120A to send data on a reserved resource is the same as a transmit power used by the first terminal 120A to send data on a primitive resource. When uplink data arrives at the second terminal 120B, the second terminal 120B sends the data on the reserved resource. In this case, both the first terminal 120A and the second terminal 120B send the data on the reserved resource. Because the reserved resource is non-orthogonally multiplexed for the two pieces of data, the two pieces of data interfere with each other. In a current technology, after receiving two pieces of data on the reserved resource, the base station 110 first decodes one of the two pieces of data, and then decodes the other piece of data by using an interference cancellation method. Because a modulation order, a code rate, or a transmit power used by the first terminal 120A on a first resource is usually relatively high, decoding of both the data of the first terminal and the data of the second terminal that are transmitted on a second resource may fail.

It should be understood that, the interference cancellation method includes, but is not limited to, the following methods: (1) signal orthogonalization/pseudo-orthogonalization, (2) an advanced receiver interference cancellation algorithm, and the like. The foregoing interference cancellation methods all belong to the prior art. For brevity, details are not described herein.

To resolve the foregoing technical problem, the embodiments of this application provide a data processing method, a base station, and a terminal, to effectively improve decoding success rates of data that is of different users and that is transmitted on a same resource.

Figure 2:
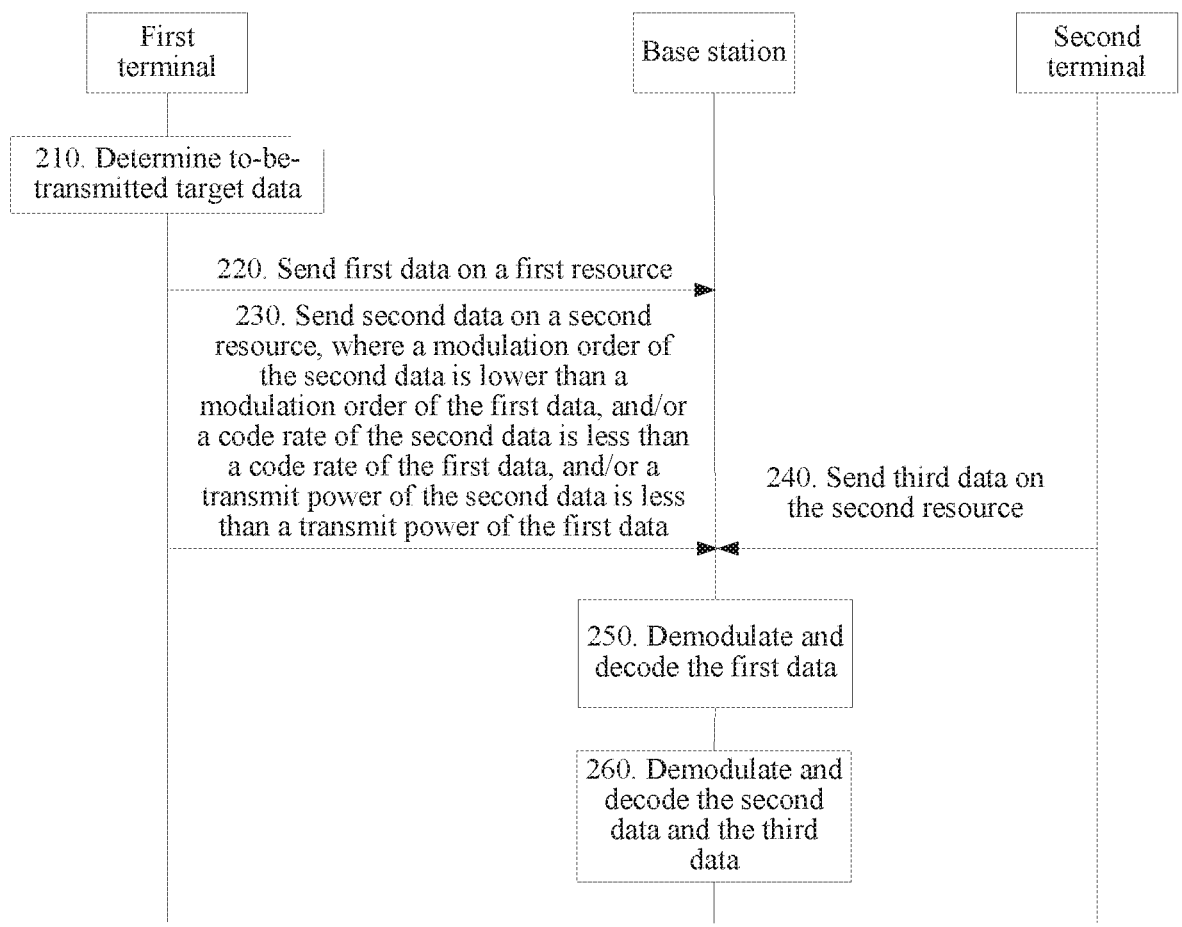
FIG. 2 is a schematic flowchart of a data processing method according to an embodiment of this application.

FIG. 2 is a schematic flowchart of a data processing method 200 according to an embodiment of this application. The method 200 includes the following steps.

210. A first terminal determines to-be-transmitted target data.

The first terminal is, for example, the first terminal 120A shown in FIG. 1.

220. The first terminal sends first data in the target data to a base station on a first resource.

The base station is, for example, the base station 110 shown in FIG. 1.

230. The first terminal sends second data in the target data to the base station on a second resource, where the second data is data in the target data except the first data, and a modulation order of the second data is lower than a modulation order of the first data, and/or a code rate of the second data is less than a code rate of the first data, and/or a transmit power of the second data is less than a transmit power of the first data.

Optionally, in this embodiment of this application, before step 220 and step 230, the method 200 further includes: sending, by the first terminal, a resource scheduling request to the base station, where the resource scheduling request is used to request transmission resources for the first terminal, and sending, by the base station, a resource scheduling response to the first terminal, where the resource scheduling response is used to indicate that the first resource and the second resource are transmission resources for the first terminal.

Figure 3:
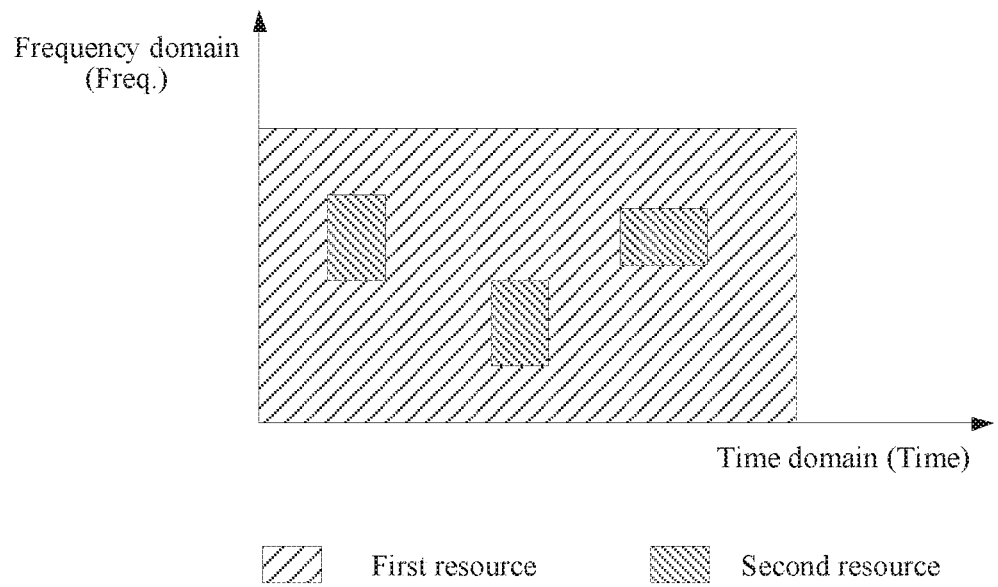
FIG. 3 is a schematic diagram of a first resource and a second resource according to an embodiment of this application.

Specifically, as shown in FIG. 3, the base station groups system resources for uplink transmission into the first resource and the second resource, and after receiving the resource scheduling request of the first terminal, configures both the first resource and the second resource as the transmission resources for the first terminal. The first resource and the second resource are different time frequency resources, as shown in FIG. 3.

240. A second terminal sends third data to the base station on the second resource.

The second terminal is, for example, the second terminal 120B shown in FIG. 1.

Specifically, still using FIG. 3 as an example, optionally, the base station sets the second resource as a reserved resource for the second terminal. That is, when uplink data arrives at the second terminal, the second terminal directly uses the second resource shown in FIG. 3 to send the uplink data to the base station, without reporting a resource scheduling request. Specifically, the first resource may correspond to the primitive resource described above, and the second resource corresponds to the reserved resource described above.

Specifically, the second resource may be system-predefined as the reserved resource for the second terminal, or may be notified by the base station to the second terminal through downlink control signaling. Optionally, that the second resource is the reserved resource for the second terminal may further be notified to the first terminal.

250. The base station demodulates and decodes the first data.

Specifically, the base station demodulates and decodes the first data based on a modulation scheme and an encoding scheme for the first data.

260. The base station demodulates and decodes the second data and the third data.

Specifically, the base station demodulates and decodes the second data based on a modulation scheme and an encoding scheme for the second data, and demodulates and decodes the third data based on a modulation scheme and an encoding scheme for the third data.

In this embodiment of this application, the first terminal sends data on the first resource and on the second resource by using different configuration information. To be specific, a modulation order of data sent by the first terminal on the second resource is lower than a modulation order of data sent by the first terminal on the first resource, and/or a code rate of the data sent by the first terminal on the second resource is less than a code rate of the data sent by the first terminal on the first resource, and/or a transmit power of the second data is less than a transmit power of the first data. It should be understood that, a lower modulation order of the second data leads to a higher probability of successfully decoding the second data, and higher accuracy of reconstructing the second data when interference is cancelled, thereby leading to a higher interference cancellation rate and a higher probability of successfully decoding the third data. A lower code rate of the second data leads to higher accuracy of reconstructing the second data when interference is cancelled, thereby leading to a higher interference cancellation rate and a higher probability of successfully decoding the third data. A lower transmit power of the second data leads to less interference on the third data, a higher probability of successfully decoding the third data, and higher accuracy of reconstructing the third data when interference is cancelled, thereby leading to a higher interference cancellation rate and a higher probability of successfully decoding the second data. Therefore, this embodiment of this application can effectively improve a success rate of decoding, by the base station, the two pieces of data (the data sent by the first terminal and the second terminal on the second resource) that are transmitted on the second resource.

Optionally, in the embodiment shown in FIG. 2, the method 200 further includes: sending, by the base station, first configuration information to the first terminal, where the first configuration information is configuration information required when the first terminal sends data on the first resource, and the first configuration information includes at least one of the following information: modulation order information of the first data, code rate information of the first data, and transmit power information of the first data. Step 220 of sending, by the first terminal, first data in the target data to a base station on a first resource includes: sending, by the first terminal to the base station on the first resource, the first data processed by using the first configuration information.

Specifically, the base station may deliver the first configuration information to the first terminal through physical layer control signaling such as a PDCCH, through MAC signaling such as a MAC CE, or through RRC signaling.

Optionally, in the embodiment shown in FIG. 2, the method 200 further includes: sending, by the base station, second configuration information to the first terminal, where the second configuration information is configuration information required when the first terminal sends data on the second resource, and the second configuration information includes at least one of the following information: modulation order information of the second data, code rate information of the second data, and transmit power information of the second data. Step 230 of sending, by the first terminal, second data in the target data to the base station on a second resource includes: sending, by the first terminal to the base station on the second resource, the second data processed by using the second configuration information.

Specifically, the base station sends the second configuration information to the first terminal through physical layer control signaling such as a PDCCH, through MAC signaling such as a MAC CE, or through RRC signaling.

In this embodiment of this application, the first terminal sends, to the base station on the first resource, the first data processed by using the first configuration information, and sends, to the base station on the second resource, the second data processed by using the second configuration information, so that the modulation order of the second data is lower than the modulation order of the first data, and/or the code rate of the second data is less than the code rate of the first data, and/or the transmit power of the second data is less than the transmit power of the first data, thereby effectively improving a success rate of decoding, by the base station, the two pieces of data (the second data sent by the first terminal and the third data sent by the second terminal) that are transmitted on the second resource.

Optionally, in this embodiment of this application, the first configuration information and the second configuration information may be delivered by the base station to the first terminal, or may be system-predefined.

Optionally, the first configuration information is delivered by the base station to the first terminal and the second configuration information is system-predefined, or the first configuration information is system-predefined and the second configuration information is delivered by the base station to the first terminal, or the first configuration information and the second configuration information are both delivered by the base station to the first terminal, or the first configuration information and the second configuration information are both system-predefined.

Optionally, in an embodiment, the first terminal in this embodiment may be an eMBB terminal, and the second terminal may be a URLLC terminal.

Specifically, with reference to FIG. 4 to FIG. 8, the following describes in detail the data processing method provided in this embodiment of this application by using an example in which the first terminal is an eMBB terminal and the second terminal is a URLLC terminal.

Figure 4:
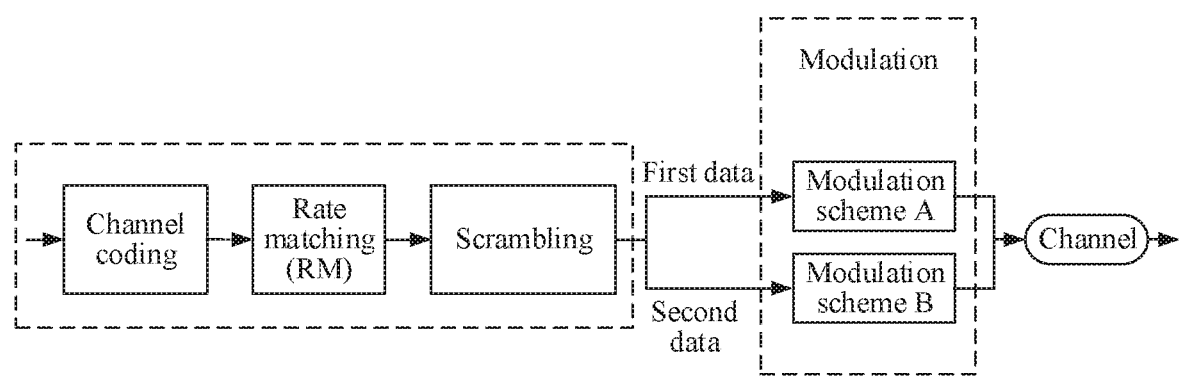
FIG. 4 is a schematic diagram of a data processing method according to an embodiment of this application.

FIG. 4 is a schematic diagram of a data processing method according to an embodiment of this application. In this embodiment, the modulation order of the second data sent on the second resource is lower than the modulation order of the first data sent on the first resource.

Specifically, the eMBB terminal sends a resource scheduling request to the base station, to request transmission resources for the eMBB terminal. The base station uses the first resource and the second resource (shown in FIG. 3) as the transmission resources for the eMBB terminal, determines corresponding configuration information based on different resources used by the eMBB terminal, determines the first configuration information as configuration information required when the eMBB terminal sends data on the first resource, and determines the second configuration information as configuration information required when the eMBB terminal sends data on the second resource. The first configuration information and the second configuration information each include at least information used to indicate a modulation order, and the modulation order in the second configuration information is lower than the modulation order in the first configuration information. It should be understood that, the first configuration information may be determined based on uplink configuration information in an existing LTE system. The base station sends a resource scheduling response to the first terminal, to indicate that the first resource and the second resource are the transmission resources for the first terminal. The resource scheduling response further includes the first configuration information and the second configuration information. After receiving the resource scheduling response, the eMBB terminal sends data to the base station separately on the first resource and the second resource. The first configuration information is used to process the first data sent on the first resource, and the second configuration information is used to process the second data sent on the second resource.

It is assumed that the first configuration information includes a modulation scheme A, the second configuration information includes a modulation scheme B, and a modulation order in the modulation scheme B is lower than a modulation order in the modulation scheme A. As shown in FIG. 4, the eMBB terminal uses the modulation scheme A to modulate the first data sent on the first resource, and uses the modulation scheme B to modulate the second data sent on the second resource. After receiving the data sent by the eMBB terminal, the base station demodulates, based on the modulation scheme A, the first data received on the first resource, and demodulates, based on the modulation scheme B, the second data received on the second resource.

It should be understood that, as shown in FIG. 4, when needing to send data, a transmit end device (corresponding to the eMBB terminal in this embodiment) first performs channel coding, rate matching (RM), and scrambling on the data (denoted as data D) that needs to be sent, to obtain a target code sequence, then modulates (Modulation) the target code sequence, and finally sends a modulated sequence on a channel. Correspondingly, after receiving the sequence transmitted on the channel, a receive end device (corresponding to the base station in this embodiment) obtains, through demodulation, descrambling, rate de-matching, and channel decoding, decoded data corresponding to the data D.

It should be understood that the data processing method in FIG. 4 is merely an example, and other processes may further be included in an actual transmission process. For example, before the channel coding, code block segmentation may further be performed. Conversely, a receive end device may perform a corresponding reverse process. For another example, interleaving, cell-specific scrambling, mapping a resource onto a physical channel resource for transmission may further be performed after the modulation process. Conversely, the receive end device may perform a corresponding reverse process to obtain source information.

In this embodiment, the first data and the second data are not distinguished for all processing (content in a dashed box in FIG. 4) before the modulation performed by the eMBB terminal. That is, the to-be-transmitted target data is processed in a same manner. However, data obtained after the rate matching is divided into the first data and the second data, the modulation scheme A is used to modulate the first data, and the modulation scheme B is used to modulate the second data. The eMBB terminal sends, on the first resource, the first data modulated by using the modulation scheme A, and sends, on the second resource, the second data modulated by using the modulation scheme B. Correspondingly, after receiving the data sent by the eMBB terminal, the base station uses the modulation scheme A to demodulate the first data, and uses the modulation scheme B to demodulate the second data.

It should be understood that, the modulation refers to a process in which bit information is mapped to a modulation symbol. That a modulation order in the modulation scheme B is lower than a modulation order in the modulation scheme A means that number of bits carried on one modulation symbol in the modulation scheme B is less than number of bits carried on one modulation symbol in the modulation scheme A. It should further be understood that, a lower modulation order of data leads to a higher demodulation success rate and a higher decoding success rate of the data.

When the URLLC terminal sends the third data on the second resource, that is, both the URLLC terminal and the eMBB terminal send uplink data on the second resource, because the data sent by the eMBB terminal and the URLLC terminal is non-orthogonal in a same resource area, the two pieces of data interfere with each other. In this case, decoding of both the second data of the eMBB terminal and the third data of the URLLC terminal that are transmitted on the second resource may fail. In this embodiment, the base station instructs the eMBB terminal to use a lower-order modulation scheme on the second resource, so that even though the second data sent by the eMBB terminal is interfered by the third data sent by the URLLC terminal, a probability of successfully decoding the second data is higher. In this way, reconstruction of the second data is more accurate when the interference is cancelled, and an interference cancellation rate is higher. Further, a probability of successfully decoding the third data of the URLLC terminal may also be higher.

It should further be understood that, in the embodiment described with reference to FIG. 4, in addition to the information used to indicate the modulation order, the first configuration information and the second configuration information may further include information used to indicate a code rate, a transmit power, and the like.

Figure 5:
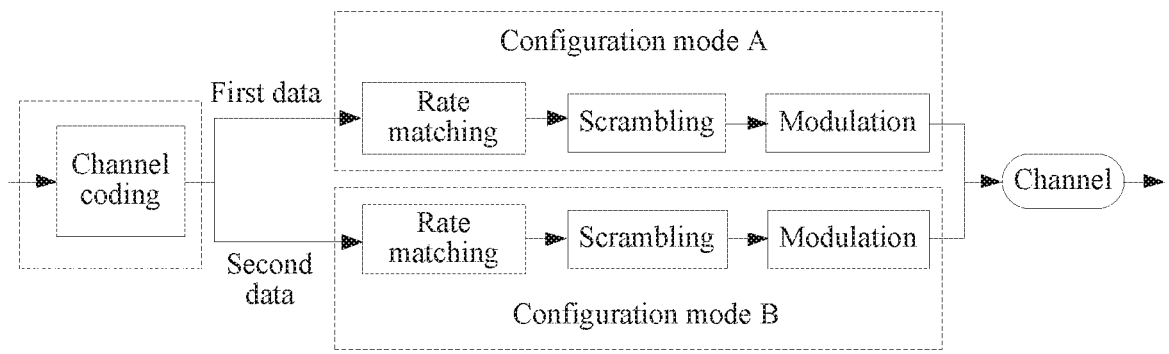
FIG. 5 is another schematic diagram of a data processing method according to an embodiment of this application.

FIG. 5 is another schematic diagram of a data processing method according to an embodiment of this application. In this embodiment, the code rate of the second data sent on the second resource is less than the code rate of the first data sent on the first resource. The code rate refers to a ratio of a quantity of information bits before channel coding to a quantity of bits actually carried on a physical resource.

Specifically, the eMBB terminal sends a resource scheduling request to the base station, to request transmission resources for the eMBB terminal. The base station uses the first resource and the second resource (shown in FIG. 3) as the transmission resources for the eMBB terminal, determines corresponding configuration information based on different resources used by the eMBB terminal, determines the first configuration information as configuration information required when the eMBB terminal sends data on the first resource, and determines the second configuration information as configuration information required when the eMBB terminal sends data on the second resource. The first configuration information and the second configuration information each include at least information used to indicate a code rate, and the code rate in the second configuration information is less than the code rate in the first configuration information. For example, the first configuration information may be determined based on uplink configuration information in an existing LTE system. The base station sends a resource scheduling response to the first terminal, to indicate that the first resource and the second resource are the transmission resources for the first terminal. The resource scheduling response further includes the first configuration information and the second configuration information. After receiving the resource scheduling response, the eMBB terminal sends data to the base station separately on the first resource and the second resource. The first configuration information is used to process the first data sent on the first resource, and the second configuration information is used to process the second data sent on the second resource.

It is assumed that the first configuration information includes a configuration mode A, the second configuration information includes a configuration mode B, and a code rate of data obtained through processing by using the configuration mode B is less than a code rate of data obtained through processing by using the configuration mode A. As shown in FIG. 5, the eMBB terminal processes, by using the configuration mode A, the first data in data obtained after channel coding, and processes, by using the configuration mode B, the second data (data other than the first data) in the data obtained after the channel coding. As shown in FIG. 5, the configuration mode A and the configuration mode B each include processing steps such as rate matching, scrambling, and modulation. A code rate corresponding to the rate matching in the configuration mode B is less than a code rate corresponding to the rate matching in the configuration mode A. Scrambling manners included in the configuration mode A and the configuration mode B may be the same or different, and modulation schemes included in the configuration mode A and the configuration mode B may be the same or different. After receiving the data sent by the eMBB terminal, the base station demodulates, based on the configuration mode A, the first data received on the first resource, and demodulates, based on the configuration mode B, the second data received on the second resource.

It should be understood that, the rate matching (RM) means that bits on a transmission channel are repeated or punctured to match a carrying capability of a physical channel, so that a code rate required by a transmission format is achieved during resource mapping. It should further be understood that, in this embodiment, the first data and the second data are not distinguished for all processing (content in a dashed box in FIG. 5) before the rate matching performed by the eMBB terminal. That is, the to-be-transmitted data is processed in a same manner. However, data obtained after the channel coding is divided into the first data and the second data, the configuration mode A is used to process the first data, and the configuration mode B is used to process the second data.

Optionally, in this embodiment of this application, alternatively, the data needing to be sent by the eMBB terminal may be directly divided into two parts of data before the channel coding. Then, channel coding is performed on the two parts of data separately, a part of data (that is, the first data) obtained after the channel coding is processed by using the configuration mode A, and the other part of data (that is, the second data) obtained after the channel coding is processed by using the configuration mode B.

It should be understood that, that a code rate of data obtained through processing by using the configuration mode B is less than a code rate of data obtained through processing by using the configuration mode A means that compared with the data obtained through processing by using the configuration mode B, the data (all information elements) that is of a same quantity of bits and that is obtained through processing by using the configuration mode A carries a smaller amount of valid information (quantity of information elements). It should further be understood that, a lower code rate of the second data leads to higher accuracy of reconstructing the second data when interference is cancelled, thereby leading to a higher interference cancellation rate and a higher probability of successfully decoding the third data.

When the URLLC terminal sends the third data on the second resource, that is, both the URLLC terminal and the eMBB terminal send uplink data on the second resource, because the data sent by the eMBB terminal and the URLLC terminal is non-orthogonal in a same resource area, the two pieces of data interfere with each other. In this case, decoding of both the second data of the eMBB terminal and the third data of the URLLC terminal that are transmitted on the second resource may fail. In this embodiment, the base station instructs the eMBB terminal to use a lower code rate on the second resource, so that even though the second data sent by the eMBB terminal is interfered by the third data sent by the URLLC terminal, a probability of successfully decoding the second data is higher. In this way, reconstruction of the second data is more accurate when the interference is cancelled, and an interference cancellation rate is higher. Further, a probability of successfully decoding the third data of the URLLC terminal may also be higher.

Figure 6:
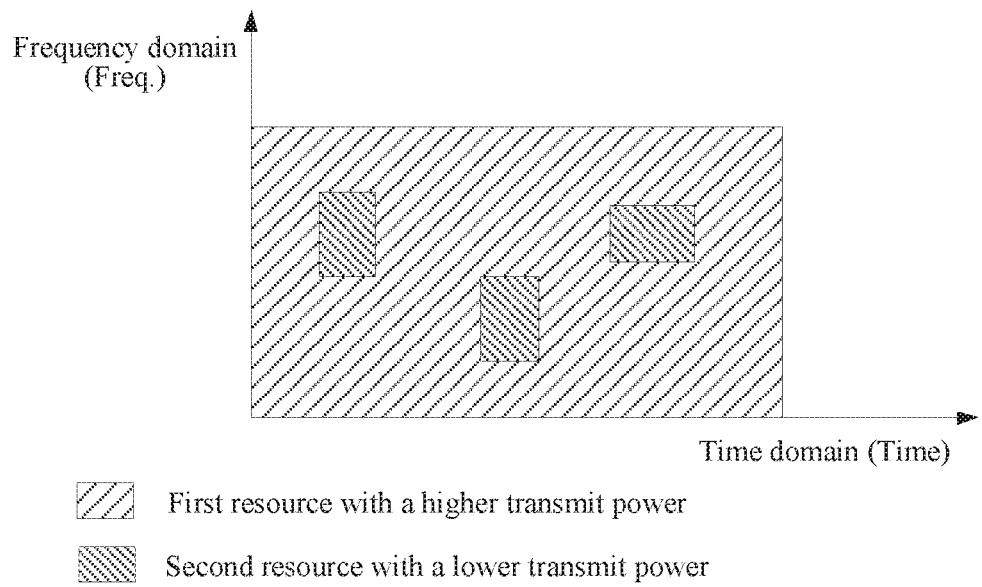
FIG. 6 is still another schematic diagram of a data processing method according to an embodiment of this application.

FIG. 6 is still another schematic diagram of a data processing method according to an embodiment of this application. In this embodiment, the transmit power of the second data sent on the second resource is less than the transmit power of the first data sent on the first resource.

Specifically, the eMBB terminal sends a resource scheduling request to the base station, to request transmission resources for the eMBB terminal. The base station uses the first resource and the second resource (shown in FIG. 3) as the transmission resources for the eMBB terminal, determines corresponding configuration information based on different resources used by the eMBB terminal, determines the first configuration information as configuration information required when the eMBB terminal sends data on the first resource, and determines the second configuration information as configuration information required when the eMBB terminal sends data on the second resource. The first configuration information and the second configuration information each include at least information used to indicate a transmit power, and the transmit power in the second configuration information is less than the transmit power in the first configuration information. It should be understood that, the first configuration information may be determined based on uplink configuration information in an existing LTE system. The base station sends a resource scheduling response to the first terminal, to indicate that the first resource and the second resource are the transmission resources for the first terminal. The resource scheduling response further includes the first configuration information and the second configuration information. After receiving the resource scheduling response, the eMBB terminal sends data to the base station separately on the first resource and the second resource. The first configuration information is used to process the first data sent on the first resource, and the second configuration information is used to process the second data sent on the second resource. As shown in FIG. 6, the transmit power of the data sent by the eMBB terminal on the second resource is less than the transmit power of the data sent on the first resource.

In this embodiment, the transmit power of the data sent by the eMBB terminal on the second resource is relatively low. This reduces impact on the data sent by the URLLC terminal. For example, the URLLC terminal has a plurality of transmission opportunities within a short time period. Even though an error occurs in first several transmissions, data can be successfully transmitted on a subsequent resource. In this way, the URLLC terminal has an extremely high transmission success probability (for example, 99.99%) within a short time period (for example, 1 ms). This can ensure transmission performance of the data sent by the URLLC terminal. Therefore, in this embodiment of this application, data transmission reliability of the URLLC terminal can further be improved by reducing the power of the eMBB terminal on the second resource. After the data of the URLLC terminal is successfully decoded, interference cancellation is further performed on the data of the eMBB terminal, so that a decoding success rate of the data of the eMBB terminal can also be greatly improved.

Optionally, in an embodiment, step 230 of sending, by the first terminal, second data in the target data to the base station on a second resource in the embodiment shown in FIG. 2 includes: sending, by the first terminal to the base station on the second resource, the second data encoded by using a multiple-access coding technology, where the third data is also encoded by using the multiple-access coding technology, and a multiple-access coding codebook corresponding to the second data is different from a multiple-access coding codebook corresponding to the third data.

Specifically, the multiple-access coding technology includes, but is not limited to, sparse code multiple access (SCMA) and Code Division Multiple Access (CDMA).

Optionally, in this embodiment of this application, the method 200 further includes: receiving, by the first terminal, a first codebook sent by the base station, where the first codebook is a codebook required when the first terminal performs multiple access coding on the second data. The base station further sends a second codebook to the second terminal, where the second codebook is a codebook required when the second terminal performs multiple access coding on the third data, and the first codebook is different from the second codebook.

Figure 7:
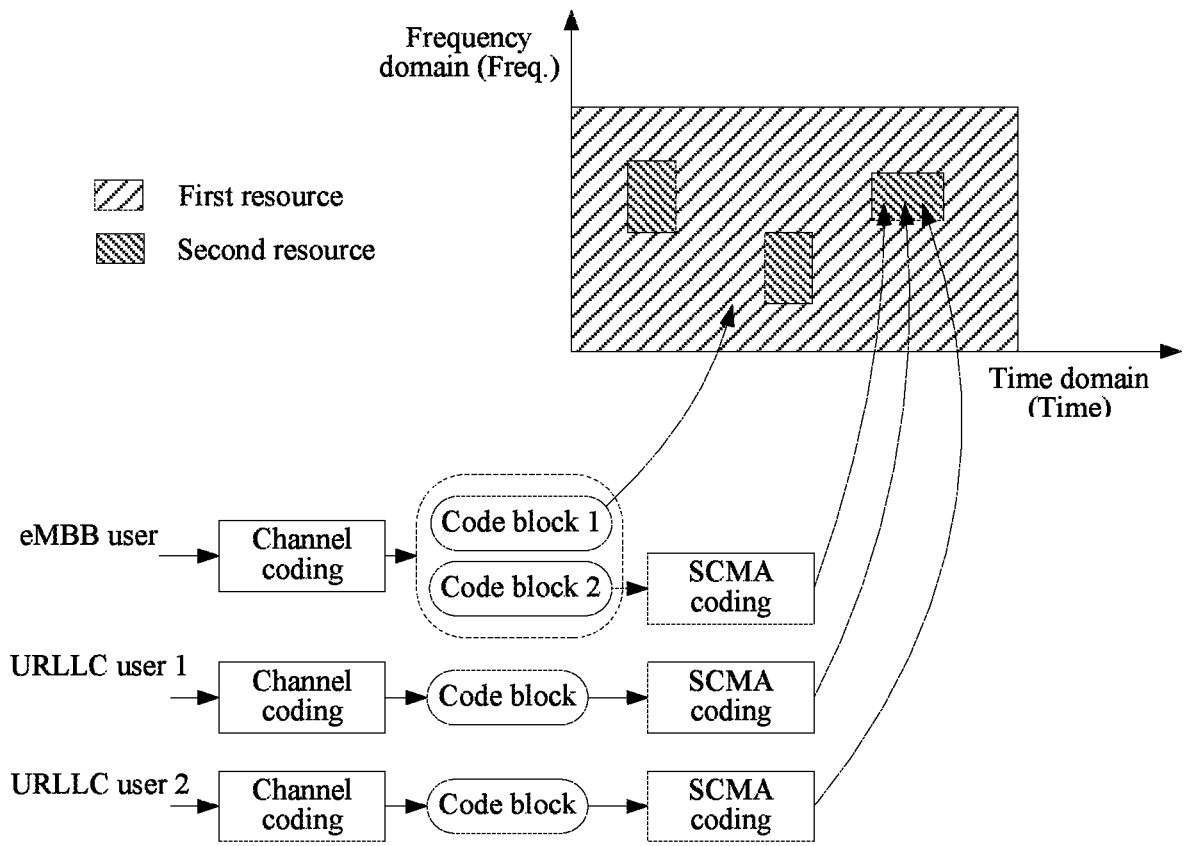
FIG. 7 is still another schematic diagram of a data processing method according to an embodiment of this application.

Specifically, as shown in FIG. 7, that the first terminal is an eMBB terminal, the second terminal is an URLLC terminal, and the multiple-access coding technology is SCMA is used as an example. After the channel coding, SCMA coding needs to be performed on both the second data sent by the eMBB terminal on the second resource and the third data sent by the URLLC terminal on the second resource. The URLLC terminal performs SCMA coding on encoded data obtained through the channel coding, and sends, on the second resource, the third data obtained after the SCMA coding. After completing the channel coding, the eMBB terminal performs SCMA coding on the second data (a code block 2 shown in FIG. 7) sent on the second resource, and may not perform SCMA coding on the first data (a code block 1 shown in FIG. 7) sent on the first resource.

It should be understood that, during the SCMA coding, a plurality of users are allowed to multiplex a same resource. A same second resource may be multiplexed by: (1) one eMBB user and one or more URLLC users; and (2) a plurality of URLLC users. The base station can effectively separate data of all users multiplexing a same second resource. That is, the base station can successfully decode the second data sent by the eMBB terminal and the third data sent by the URLLC terminal.

During the SCMA coding, an SCMA codebook needs to be configured, and both the base station and all users store a plurality of SCMA codebooks. When performing SCMA coding, a user needs to select one codebook from the plurality of SCMA codebooks, and it is ensured that SCMA codebooks of different users multiplexing a same second resource are different. A method for ensuring that the SCMA codebooks of the different users are different includes but is not limited to: (1) The base station configures an SCMA codebook through signaling, for example, instructs the eMBB terminal or the URLLC terminal to configure an SCMA codebook through RRC signaling or downlink control information. (2) A user needs to select an appropriate SCMA codebook from an SCMA codebook set by himself or herself according to a preset rule during the SCMA coding, where the selection rule may be performing selection based on a UE ID, UE re-grouping, or the like. The manner of selection based on the UE ID means that a user first numbers available SCMA codebooks (where, for example, numbers are 1, 2, . . . , and N), and then uses a UE ID of the user to perform a modulo operation on a total quantity N of available SCMA codebooks. Assuming that a value obtained after the modulo operation is X, an SCMA codebook numbered X is selected. The manner of selection based on the UE re-grouping means that a user group corresponding to each SCMA codebook continually changes on different second resources, and even though two users have identical SCMA codebooks on a current second resource, it can be ensured that SCMA codebooks of different users are different in a next transmission.

In this embodiment of this application, an eMBB user and a URLLC user multiplexing a second resource select, based on a configuration, different SCMA codebooks to perform SCMA coding, so that a receive end device (that is, the base station) can recover data of all different users multiplexing the second resource. Therefore, this embodiment of this application not only can resolve a problem of mutual interference between the eMBB user and the URLLC user on the second resource but also can effectively resolve a problem of a transmission collision between a plurality of URLLC users on a same second resource.

Optionally, in an embodiment, the target data in the embodiment shown in FIG. 2 is an encoded bitstream obtained after the first terminal performs channel coding on original data. The encoded bitstream includes information bits and redundant bits, and the second data includes all or some redundant bits in the encoded bitstream.

Optionally, in this embodiment of this application, when a transmission resource required for all redundant bits in the encoded bitstream is equal to the second resource, all the redundant bits in the encoded bitstream are used as the second data. When a transmission resource required for all redundant bits in the encoded bitstream is smaller than the second resource, all the redundant bits and some information bits in the encoded bitstream are used as the second data, where a sum of the transmission resource required for all the redundant bits and a transmission resource required for the some information bits is equal to the second resource. When a transmission resource required for all redundant bits in the encoded bitstream is larger than the second resource, some redundant bits in the encoded bitstream are used as the second data, where a transmission resource required for the some redundant bits is equal to the second resource.

Figure 8:
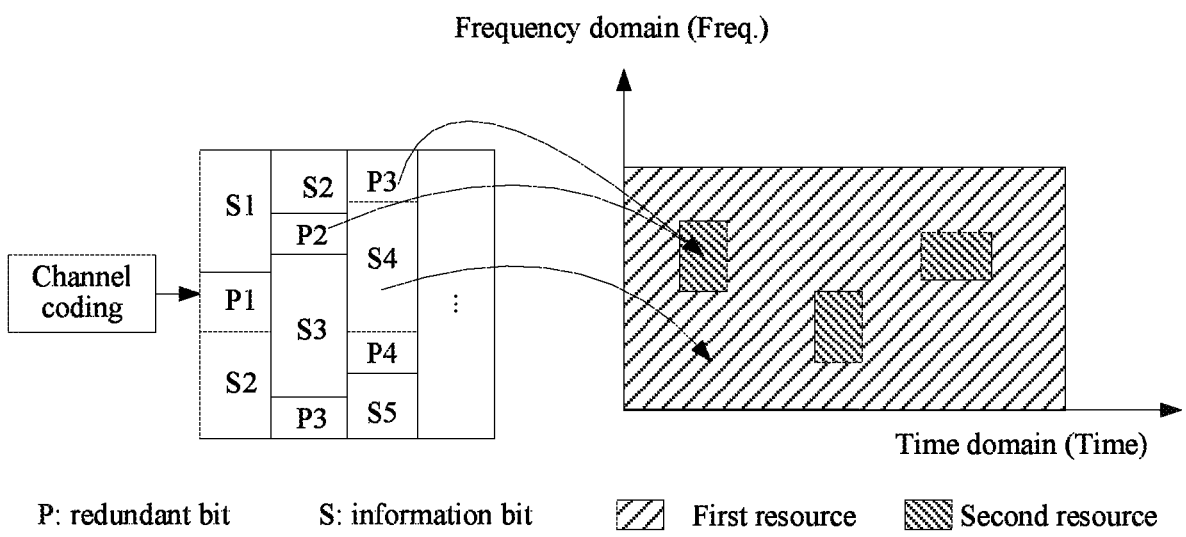
FIG. 8 is still another schematic diagram of a data processing method according to an embodiment of this application.

Specifically, as shown in FIG. 8, that the first terminal is an eMBB terminal, and the second terminal is an eMBB terminal is still used as an example. After the eMBB terminal performs channel coding, a bitstream of each code block includes information bits and redundant bits. During resource mapping, the eMBB terminal preferentially maps the redundant bits onto the second resource. A possible manner is that after completing the channel coding, the eMBB terminal sequentially takes out a redundant bit from each code block, and sequentially maps the redundant bits onto the second resource based on a takeout order. If a resource required for the redundant bits is larger than the second resource, extra redundant bits are mapped onto the first resource. If a resource required for the redundant bits is smaller than the second resource, the information bits need to be mapped onto the second resource. Next, the information bits of each code block are mapped onto remaining resources. An objective is to enable data of the eMBB terminal on the second resource to be redundant bits as far as possible.

When receiving eMBB service data, the base station respectively takes out redundant bits (which may also include some information bits) from the second resource and information bits (which may also include some redundant bits) from the first resource according to a mapping rule. All bits are re-arranged and then decoded according to an order obtained after the channel coding.

In this embodiment of this application, the eMBB terminal mainly sends redundant bits on the second resource, and mainly sends information bits on the first resource. Even though the third data of the URLLC terminal and the redundant bits of the eMBB terminal that are transmitted on the second resource interfere with each other, the base station may successfully decode, based on the information bits received on the first resource, the redundant bits received on the second resource, thereby successfully decoding the third data of the URLLC terminal by using an interference cancellation technology.

Optionally, in the embodiment shown in FIG. 8, when the redundant bits of the eMBB terminal are transmitted on the second resource, alternatively, processing may be performed by using any method or a combination of a plurality of methods shown in FIG. 4 to FIG. 7. This is not limited in this embodiment of this application.

It should be understood that, the methods described above with reference to FIG. 4 to FIG. 8 may be separately performed or any combination of the methods may be performed.

In conclusion, in the embodiments of this application, the first terminal sends data on the first resource and on the second resource by using different configuration information. To be specific, a modulation order of data sent by the first terminal on the second resource is lower than a modulation order of data sent by the first terminal on the first resource, and/or a code rate of the data sent by the first terminal on the second resource is less than a code rate of the data sent by the first terminal on the first resource, and/or a transmit power of the second data is less than a transmit power of the first data. In this way, a success rate of decoding, by the base station, the two pieces of data (the data sent by the first terminal and the second terminal on the second resource) that are transmitted on the second resource can be effectively improved.

The data processing method provided in the embodiments of this application is described above with reference to FIG. 2 to FIG. 8, and a base station and a terminal provided in the embodiments of this application will be described below with reference to FIG. 9 to FIG. 12.

Figure 9:
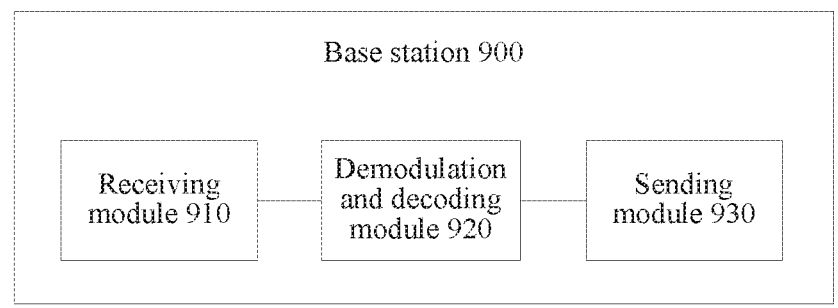
FIG. 9 is a schematic block diagram of a base station according to an embodiment of this application.

FIG. 9 is a schematic block diagram of a base station 900 according to an embodiment of this application. The base station 900 includes:

a receiving module 910, configured to receive first data from a first terminal on a first resource, where the receiving module 910 is further configured to receive second data from the first terminal and third data from a second terminal on a second resource, where a modulation order of the second data is lower than a modulation order of the first data, and/or a code rate of the second data is less than a code rate of the first data, and/or a transmit power of the second data is less than a transmit power of the first data; and a demodulation and decoding module 920, configured to demodulate and decode the first data, where the demodulation and decoding module 920 is further configured to demodulate and decode the second data and the third data.

In this embodiment of this application, the first terminal sends data on the first resource and on the second resource by using different configuration information. To be specific, a modulation order of data sent by the first terminal on the second resource is lower than a modulation order of data sent by the first terminal on the first resource, and/or a code rate of the data sent by the first terminal on the second resource is less than a code rate of the data sent by the first terminal on the first resource, and/or a transmit power of the second data is less than a transmit power of the first data. Therefore, this embodiment of this application can effectively improve a success rate of decoding, by the base station, the two pieces of data (the data sent by the first terminal and the second terminal on the second resource) that are transmitted on the second 	resource.

It should be understood that, as shown in FIG. 9, the base station 900 may further include a sending module 930. The sending module 930 is configured to send a message to a terminal, for example, send physical layer control signaling such as a PDCCH to the terminal, send MAC signaling such as a MAC CE to the terminal, or send RRC signaling to the terminal.

Optionally, in an embodiment, the sending module 930 includes a first sending module 931, configured to send first configuration information to the first terminal, where the first configuration information is configuration information required when the first terminal sends data on the first resource, and the first configuration information includes at least one of the following information: modulation order information of the first data, code rate information of the first data, and transmit power information of the first data.

Optionally, in an embodiment, the sending module 930 includes a second sending module 932, configured to send second configuration information to the first terminal, where the second configuration information is configuration information required when the first terminal sends data on the second resource, and the second configuration information includes at least one of the following information: modulation order information of the second data, code rate information of the second data, and transmit power information of the second data.

Optionally, in an embodiment, the receiving module 910 is further configured to receive a resource scheduling request from the first terminal, where the resource scheduling request is used to request transmission resources for the first terminal. The sending module 930 includes a third sending module 933, configured to send a resource scheduling response to the first terminal, where the resource scheduling response is used to indicate that the first resource and the second resource are transmission resources for the first terminal.

Optionally, in an embodiment, the second resource is a resource reserved for the second terminal.

Specifically, the demodulation and decoding module 920 in this embodiment of this application may be implemented by a processor or a processor-related circuit, the receiving module 910 may be implemented by a receiver or a receiver-related circuit, and the sending module 930 may be implemented by a transmitter or a transmitter-related circuit.

Figure 10:
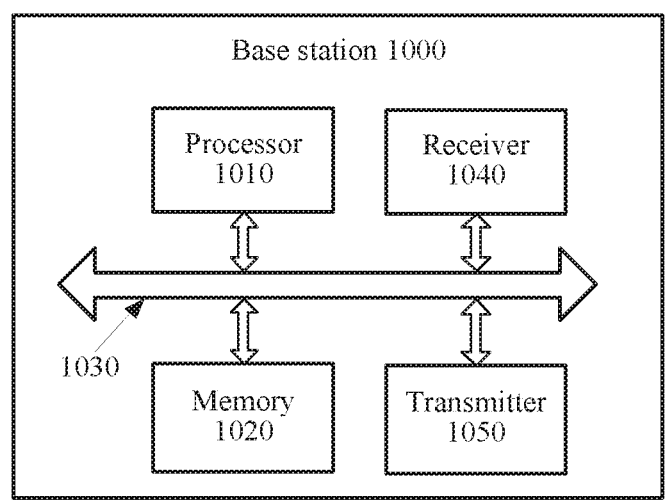
FIG. 10 is another schematic block diagram of a base station according to an embodiment of this application.

As shown in FIG. 10, an embodiment of this application further provides a base station 1000. The base station 1000 includes a processor 1010, a memory 1020, a bus system 1030, a receiver 1040, and a transmitter 1050. The processor 1010, the memory 1020, the receiver 1040, and the transmitter 1050 are connected by using the bus system 1030. The memory 1020 is configured to store an instruction. The processor 1010 is configured to execute the instruction stored in the memory 1020, to control the receiver 1040 to receive a signal, and control the transmitter 1050 to send a signal. The receiver 1040 is configured to: receive first data from a first terminal on a first resource, and receive second data from the first terminal and third data from a second terminal on a second resource, where a modulation order of the second data is lower than a modulation order of the first data, and/or a code rate of the second data is less than a code rate of the first data, and/or a transmit power of the second data is less than a transmit power of the first data. The processor 1010 is configured to demodulate and decode the first data, and demodulate and decode the second data and the third data.

In this embodiment of this application, the first terminal sends data on the first resource and on the second resource by using different configuration information. To be specific, a modulation order of data sent by the first terminal on the second resource is lower than a modulation order of data sent by the first terminal on the first resource, and/or a code rate of the data sent by the first terminal on the second resource is less than a code rate of the data sent by the first terminal on the first resource, and/or a transmit power of the second data is less than a transmit power of the first data. Therefore, this embodiment of this application can effectively improve a success rate of decoding, by the base station, the two pieces of data (the data sent by the first terminal and the second terminal on the second resource) that are transmitted on the second resource.

Optionally, in an embodiment, the transmitter 1040 is configured to send first configuration information to the first terminal, where the first configuration information is configuration information required when the first terminal sends data on the first resource, and the first configuration information includes at least one of the following information: modulation order information of the first data, code rate information of the first data, and transmit power information of the first data.

Optionally, in an embodiment, the transmitter 1040 is configured to send second configuration information to the first terminal, where the second configuration information is configuration information required when the first terminal sends data on the second resource, and the second configuration information includes at least one of the following information: modulation order information of the second data, code rate information of the second data, and transmit power information of the second data.

Optionally, in an embodiment, the receiver 1030 is configured to receive a resource scheduling request from the first terminal, where the resource scheduling request is used to request transmission resources for the first terminal. The transmitter 1040 is configured to send a resource scheduling response to the first terminal, where the resource scheduling response is used to indicate that the first resource and the second resource are transmission resources for the first terminal.

Optionally, in an embodiment, the second resource is a resource reserved for the second terminal.

Optionally, in an embodiment, the first terminal is an enhanced mobile broadband eMBB terminal, and the second terminal is an ultra-reliable and ultra-low-latency communications URLLC terminal.

It should be understood that, the base station 900 shown in FIG. 9 or the base station 1000 shown in FIG. 10 may be configured to perform an operation or a procedure related to the base station in the method embodiments, and operations and/or functions of the modules of the base station 900 or the base station 1000 are respectively intended to implement corresponding procedures in the method embodiments. For brevity, details are not described herein again.

Figure 11:
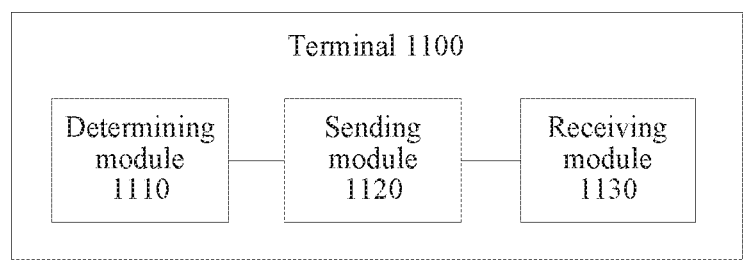
FIG. 11 is a schematic block diagram of a terminal according to an embodiment of this application.

FIG. 11 is a schematic block diagram of a terminal 1100 according to an embodiment of this application. As shown in FIG. 11, the terminal 1100 includes:

a determining module 1110, configured to determine to-be-transmitted target data; and a sending module 1120, configured to send first data in the target data on a first resource.

The sending module 1120 is further configured to send second data in the target data on a second resource. The second data is data in the target data except the first data, the second resource is further used to transmit third data of a second terminal, and a modulation order of the second data is lower than a modulation order of the first data, and/or a code rate of the second data is less than a code rate of the first data, and/or a transmit power of the second data is less than a transmit power of the first data.

In this embodiment of this application, the terminal 1100 sends data on the first resource and on the second resource by using different configuration information. To be specific, a modulation order of data sent by the terminal 1100 on the second resource is lower than a modulation order of data sent by the terminal 1100 on the first resource, and/or a code rate of the data sent by the terminal 1100 on the second resource is less than a code rate of the data sent by the terminal 1100 on the first resource, and/or a transmit power of the second data is less than a transmit power of the first data. Therefore, this embodiment of this application can effectively improve a success rate of decoding, by a base station, the two pieces of data (the data sent by the terminal 1100 and the second terminal on the second resource) that are transmitted on the second resource.

It should be understood that, as shown in FIG. 11, the terminal 1100 may further include a receiving module 1130. The receiving module 1130 is configured to receive a message sent by the base station, for example, receive physical layer control signaling such as a PDCCH sent by the base station, receive MAC signaling such as a MAC CE sent by the base station, or receive RRC signaling sent by the base station.

Optionally, in an embodiment, the receiving module 1130 includes a first receiving module 1131, configured to receive first configuration information from the base station, where the first configuration information is configuration information required when the terminal 1100 sends data on the first resource, and the first configuration information includes at least one of the following information: modulation order information of the first data, code rate information of the first data, and transmit power information of the first data.

Optionally, in an embodiment, the receiving module 1130 includes a second receiving module 1132, configured to receive second configuration information from the base station, where the second configuration information is configuration information required when the terminal 1100 sends data on the second resource, and the second configuration information includes at least one of the following information: modulation order information of the second data, code rate information of the second data, and transmit power information of the second data.

Optionally, in an embodiment, the sending module 1120 is further configured to send a resource scheduling request to the base station, where the resource scheduling request is used to request transmission resources for the terminal 1100. The receiving module 1130 includes a third receiving module 1131, configured to receive a resource scheduling response from the base station, where the resource scheduling response is used to indicate that the first resource and the second resource are transmission resources for the terminal 1100.

Optionally, in an embodiment, the second resource is a resource reserved for the second terminal.

Optionally, in an embodiment, the terminal is an enhanced mobile broadband eMBB terminal, and the second terminal is an ultra-reliable and ultra-low-latency communications URLLC terminal.

Specifically, the determining module 1110 in this embodiment of this application may be implemented by a processor or a processor-related circuit, the sending module 1120 may be implemented by a transmitter or a transmitter-related circuit, and the receiving module 1130 may be implemented by a receiver or a receiver-related circuit.

Figure 12:
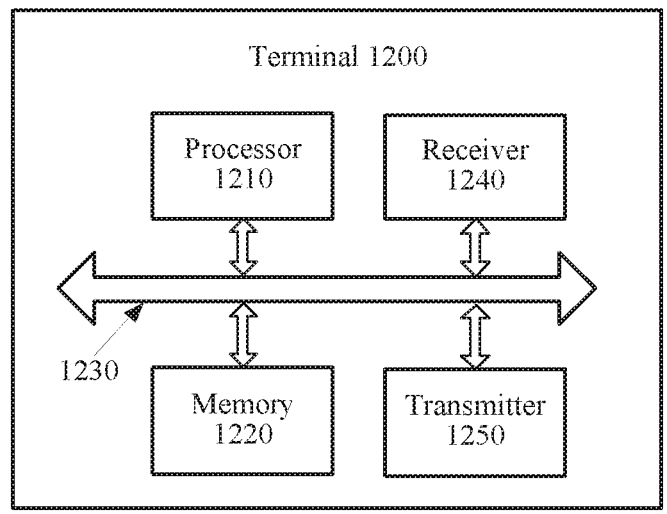
FIG. 12 is another schematic block diagram of a terminal according to an embodiment of this application.

As shown in FIG. 12, an embodiment of this application further provides a terminal 1200. The terminal 1200 includes a processor 1210, a memory 1220, a bus system 1230, a receiver 1240, and a transmitter 1250. The processor 1210 is configured to determine to-be-transmitted target data. The transmitter 1250 is configured to: send first data in the target data on a first resource, and send second data in the target data on a second resource. The second data is data in the target data except the first data, the second resource is further used to transmit third data of a second terminal, and a modulation order of the second data is lower than a modulation order of the first data, and/or a code rate of the second data is less than a code rate of the first data, and/or a transmit power of the second data is less than a transmit power of the first data.

In this embodiment of this application, the terminal 1200 sends data on the first resource and on the second resource by using different configuration information. To be specific, a modulation order of data sent by the terminal 1200 on the second resource is lower than a modulation order of data sent by the terminal 1200 on the first resource, and/or a code rate of the data sent by the terminal 1200 on the second resource is less than a code rate of the data sent by the terminal 1200 on the first resource, and/or a transmit power of the second data is less than a transmit power of the first data. Therefore, this embodiment of this application can effectively improve a success rate of decoding, by the base station, the two pieces of data (the data sent by the terminal 1200 and the second terminal on the second resource) that are transmitted on the second resource.

Optionally, in an embodiment, the receiver 1230 is configured to receive first configuration information from the base station. The first configuration information is configuration information required when the terminal 1200 sends data on the first resource, and the first configuration information includes at least one of the following information: modulation order information of the first data, code rate information of the first data, and transmit power information of the first data.

Optionally, in an embodiment, the receiver 1230 is configured to receive second configuration information from the base station. The second configuration information is configuration information required when the terminal 1200 sends data on the second resource, and the second configuration information includes at least one of the following information: modulation order information of the second data, code rate information of the second data, and transmit power information of the second data.

Optionally, in an embodiment, the transmitter 1240 is configured to send a resource scheduling request to the base station, where the resource scheduling request is used to request transmission resources for the terminal 1200. The receiver 1230 is configured to receive a resource scheduling response from the base station, where the resource scheduling response is used to indicate that the first resource and the second resource are transmission resources for the terminal 1200.

Optionally, in an embodiment, the second resource is a resource reserved for the second terminal.

Optionally, in an embodiment, the terminal 1200 is an enhanced mobile broadband eMBB terminal, and the second terminal is an ultra-reliable and ultra-low-latency communications URLLC terminal.

It should be understood that, the terminal 1100 shown in FIG. 11 or the terminal 1200 shown in FIG. 12 may be configured to perform an operation or a procedure related to a cloud-side device in the method embodiments, and operations and/or functions of the modules of the terminal 1100 or the terminal 1200 are respectively intended to implement corresponding procedures in the method embodiments. For brevity, details are not described herein again.

It should be understood that, the processor in the embodiments of this application may be a central processing unit (CPU), or may be another general-purpose processor, a digital signal processor (DSP), an application-specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any conventional processor or the like.

It may further be understood that the memory in the embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that, when the processor is a general-purpose processor, a DSP, an ASIC, an FPGA, or another programmable logic device, a discrete gate or a transistor logic device, or a discrete hardware component, the memory (a storage module) is integrated into the processor.

It should further be understood that, in addition to a data bus, the bus system in the embodiments of this application may further include a power bus, a control bus, a status signal bus, and the like. However, for clear description, various types of buses in FIG. 10 and FIG. 12 are marked as the bus system.

In an implementation process, the steps of the foregoing methods can be implemented by using a hardware integrated logical circuit in the processor, or by using instructions in a form of software. The steps of the methods disclosed with reference to the embodiments of this application may be directly performed and completed by a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should further be understood that, various numerical symbols in this specification are only distinguished for convenient description, and are not intended to limit the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

It should be understood that, in the several embodiments provided in this application, the disclosed apparatuses and methods may be implemented in other manners. For example, the described apparatus embodiments are merely examples. For example, the module division is merely logical function division and may be other division in actual implementation. For example, a plurality of modules or components may be combined or integrated into another module, or some features may be ignored or may not be performed.

The modules described as separate parts may or may not be physically separate, and parts displayed as modules may or may not be physical modules, may be located in one position, or may be distributed on a plurality of network units.

In addition, functional modules in the embodiments of this application may be integrated into one processing module, or each of the modules may exist alone physically, or two or more modules are integrated into one module.

The foregoing descriptions are merely specific implementations of the embodiments of this application. Any variation or replacement readily figured out by a person skilled in the art within the technical scope disclosed in the present disclosure shall fall within the protection scope of the embodiments of this application. Therefore, the protection scope of the embodiments of this application shall be subject to the protection scope of the claims.

What is claimed is:

1. A data processing method, comprising:
receiving, by a first terminal, second configuration information from a base station, wherein the second configuration information is configuration information required when the first terminal sends second data on a second resource, and the second configuration information comprises at least one of the following: modulation order information of the second data, code rate information of the second data, and transmit power information of the second data;
determining, by the first terminal, to-be-transmitted target data;
sending, by the first terminal, first data in the to-be-transmitted target data on a first resource; and
sending, by the first terminal, the second data in the to-be-transmitted target data on the second resource, wherein the second data comprises data in the to-be-transmitted target data other than the first data, wherein the second resource is further used to transmit third data of a second terminal, wherein the second resource is a resource reserved for the second terminal, and wherein a modulation order of the second data is lower than a modulation order of the first data, or a code rate of the second data is less than a code rate of the first data, or a transmit power of the second data is less than a transmit power of the first data.

2. The method according to claim 1, further comprising:
receiving, by the first terminal, first configuration information from the base station, wherein the first configuration information is configuration information required when the first terminal sends data on the first resource, and the first configuration information comprises at least one of the following: modulation order information of the first data, code rate information of the first data, and transmit power information of the first data.

3. The method according to claim 1, further comprising:
sending, by the first terminal, a resource scheduling request to the base station for requesting transmission resources for the first terminal; and
receiving, by the first terminal, a resource scheduling response from the base station, wherein the resource scheduling response indicates the first resource and the second resource are transmission resources for the first terminal.

4. The method according to claim 1, wherein the first terminal is an enhanced mobile broadband (eMBB) terminal, and the second terminal is an ultra-reliable and ultra-low-latency communications (URLLC) terminal.

5. A terminal device for use in a wireless communication system, the terminal device comprising:
a processor; and
a memory unit coupled to the processor for storing program instructions which, when executed by the processor, cause the terminal device to:
receive second configuration information from a base station, wherein the second configuration information is configuration information required when second data is sent on a second resource, and the second configuration information comprises at least one of the following: modulation order information of the second data, code rate information of the second data, and transmit power information of the second data;

determine to-be-transmitted target data, send first data in the to-be-transmitted target data on a first resource, and send the second data in the to-be-transmitted target data on the second resource, wherein the second data comprises data in the to-be-transmitted target data other than the first data, the second resource is further used to transmit third data of a second terminal, the second resource is a resource reserved for the second terminal, and a modulation order of the second data is lower than a modulation order of the first data, or a code rate of the second data is less than a code rate of the first data, or a transmit power of the second data is less than a transmit power of the first data.

6. The terminal device according to claim 5, wherein the program instructions, when executed by the processor, further cause the terminal device to:

receive first configuration information from the base station, wherein the first configuration information is configuration information required when data is sent on the first resource, and the first configuration information comprises at least one of the following: modulation order information of the first data, code rate information of the first data, and transmit power information of the first data.

7. The terminal device according to claim 5, wherein the program instructions, when executed by the processor, further cause the terminal device to:

send a resource scheduling request to the base station for requesting transmission resources for the terminal device; and receive a resource scheduling response from the base station, wherein the resource scheduling response indicates the first resource and the second resource are transmission resources for the terminal device.

8. The terminal device according to claim 5, wherein the terminal device is an enhanced mobile broadband (eMBB) terminal, and the second terminal is an ultra-reliable and ultra-low-latency communications (URLLC) terminal.

* * * * *